United States Patent Office 3,131,175
Patented Apr. 28, 1964

3,131,175
PROCESS OF PREPARING LICORICE
ROOT EXTRACT
Samuel I. Kalkstein, Moorestown, N.J., assignor to
Chemicals & Phosphates Limited
No Drawing. Filed June 7, 1961, Ser. No. 115,293
5 Claims. (Cl. 260—210)

This invention relates to a process of preparing licorice root extract and particularly to a process of obtaining from licorice root and aqueous extract which is clear and which remains clear on subsequent heating.

For many years it has been known that water soluble components can be obtained from shredded or ground licorice root. This has been accomplished by percolation, by decoction, or by methods involving a combination of these steps. However, in all such prior processes the initial contact between the water and the licorice root has been carried out at relatively low temperatures in the range from room temperature to about 125° F. Following this initial, relatively cold extraction, heat has been supplied until the initial extract on successive percolations reaches higher temperatures, or the extract thus obtained may be heated to temperatures up to boiling. It is also common to process and concentrate the water extract at boiling temperatures.

Various difficulties have been encountered for many years in the art of licorice root extraction and considerable effort has been expended in attempts to increase the efficiency of the percolation steps, and at the same time obtain a clear aqueous extract. While some of these measures, such as carrying out repeated percolation steps, through coarsely ground licorice root, have improved the yield of the initial extract, it has been found that this has increased the difficulties in obtaining a clear extract following the later boiling or high temperature stages. There is a very marked tendency for such extracts to turn cloudy on being heated. The present invention is directed to obtaining not only an improved yield in the initial extraction, but also in obtaining an extract which does not react adversely to later boiling or high temperature treatment.

I have discovered that certain proteins present in licorice root are the chief causes of the difficulties which have been encountered in the prior art water extraction processes. These proteins have properties characteristic of albuminoids. They are very readily soluble in cold water and in warm water, and hence are easily dissolved on penetration of the licorice root. However, they denature to an insoluble precipitate at about 166° F. This action is irreversible and the precipitate is voluminous, sticky and unfilterable.

As a part of the present invention, I have discovered that the usual coarsely ground licorice root is neither necessary nor particularly desirable. What is important is to avoid an initial albuminoid protein extraction at water temperatures below about 166° F. This is accomplished by first causing the protein to denature in situ and thus to precipitate within the fibrous licorice root structure before any substantial portion of such protein is brought out of the fibers and into water solution. Since the preciptation reaction is irreversible, the undesired precipitate remains in the fibers and is excluded from the water extract of licorice root and from the external surfaces of the licorice root particles. While a number of alternate combinations of process steps may be employed in carrying out the present invention, I have found that it is important to start with a water temperature in excess of 166° F. and to avoid a drop in temperature of the water used for extraction and the extraction slurry itself below a temperature of about 166° F. at least until the addition of licorice root has been completed. It is likewise helpful to grind the licorice root or otherwise divide it to a particle size which is sufficiently fine to permit the desired penetration of heat to the protein and to thus precipitate it in the licorice fibers in the initial stage of the process before it has had a chance to dissolve and thus become a part of the aqueous extract. I, therefore, prefer to grind the licorice root beyond the usual relatively coarse grind of about 6 to 8 mesh, employing instead a grind of from about 16 to 30 mesh, and to then introduce the ground licorice root into a vessel containing water which is maintained at a temperature in excess of 166° F. This can be accomplished in an agitator fitted extractor utilizing direct steam injection into the slurry in order to maintain it at about 180° F. while the ground root is being introduced into the heated water. When the extractor has been thus charged, it is closed and the temperature raised rapidly. The extraction is then completed under pressure. After extraction has been completed, the extractor is emptied and the slurry is conveyed by ordinary pumping equipment for subsequent clarification of thet extract by well known clarification procedures. Costly and laborious handling of the extracted root with hand forks is thereby eliminated. By thus retaining substantially all the protein in the fibrous mass separated from the aqueous extract, further significant advantages are achieved. The evaporation of the dilute extract to its concentrated form is greatly improved by the virtual elimination of albuminoid protein. The colloidally dispersed protein which is not filtered by the root beds in older processes is troublesome during evaporation by reason of its excellent insulation properties in very thin films on heat transfer surfaces. Such evaporations are frequently "touchy" and characterized by foam-over losses. A further advantage of my process relates to secondary extraction products derived from the separated root after its primary extraction. The most important of these products, an organic dispersant, relies largely for its efficacy upon the protein component removed from the root by a different solvent, such as caustic soda, during the secondary extraction. The greater retention by the root of protein when my process is practiced permits higher protein concentrations in the secondary extract. Finally, my process provides yields in a single contact extract equivalent to those requiring 6–10 contacts as practiced by older methods.

The following example is set forth as representative of a specific and preferred way of practicing the process of the present invention. It is not intended, however, that the invention be limited to the specific example given, since many variations in individual steps may be introduced without departing from the spirit or scope of the present invention.

*Example*

2000 pounds of air dry licorice root pulverized to pass a 20-mesh screen are gradually added with agitation to about 1400 gallons of water maintained at about 190° F. in an agitator-fitted extractor. Direct steam is continuously admitted to the mixture during the licorice root addition, and the temperature is maintained in the range of 190–200° F. during the entire period of root addition. The vessel is then closed and additional steam admitted until an internal pressure of 40 p.s.i. is reached. The temperature is maintained for one hour and the extractor contents discharged to an open holding tank. The slurry thus obtained is then pumped to a clarification device such as a solid bowl continuous centrifuge. The clear extract thus obtained had a dissolved solids content of about 6–8% by weight depending on the type of licorice root employed. The clarified extract is then evaporated to an extract having from about 35–50% solids by weight, which is subsequently dried for packaging.

Having thus described my invention, I claim:

1. The process of preparing an aqueous solution of licorice extract from ground licorice root fiber and water whereby the albuminoid protein component of licorice root is denatured and precipitated within the root, the steps comprising bringing the ground licorice root fiber and water together so that the initial contact of the root with the water occurs at a temperature in excess of 166° F. and under a pressure not greater than 40 p.s.i.

maintaining the mixture of licorice root fiber and water at a temperature in excess of 166° F. and under a pressure not greater than 40 p.s.i. for a period of time sufficient to insure that the entire mass of dispersed root fiber in the water is raised above the critical denaturing temperature before the protein component can be removed from the root fiber as part of the aqueous solution, and separating the aqueous solution of licorice extract from the licorice root residue by clarification of the mixture, the precipitated protein remaining, dispersed and held in the root residue.

2. The process as defined in claim 1 including the step of preparing licorice root for extraction by grinding said root to a fineness sufficient to pass through a 20 mesh screen.

3. The process as defined in claim 2 including the step of mixing the root fiber and water mass so that rapid intimate contact of the root fiber and the water will occur.

4. The process as defined in claim 3 including the steps of initially heating the water to a temperature within the range of 190° F. to 200° F. and thereafter maintaining the mixture at this temperature during the time required for the complete denaturization and precipitation of the protein component.

5. The process as defined in claim 4 including the step of adding finely ground root fiber uniformly at a control rate to water maintained at a temperature in the range of 190° F. to 200° F.

References Cited in the file of this patent

Chem. Abst., vol. 51 (1957), 18484h.
Nieman; Advances in Food Research, vol. 7 (1957), only pages 344–6 relied upon. Entire article consists of pages 339–381.

UNITED STATES PATENT OFFICE
CERTIFICATE OF CORRECTION

Patent No. 3,131,175                                      April 28, 1964

Samuel I. Kalkstein

It is hereby certified that error appears in the above numbered patent requiring correction and that the said Letters Patent should read as corrected below.

Column 1, line 11, for "and" read -- an --; column 2, line 21, for "thet" read -- the --.

Signed and sealed this 20th day of October 1964.

(SEAL)
Attest:

ERNEST W. SWIDER                                      EDWARD J. BRENNER
Attesting Officer                                           Commissioner of Patents